US011440295B2

(12) United States Patent
Yoshida et al.

(10) Patent No.: US 11,440,295 B2
(45) Date of Patent: Sep. 13, 2022

(54) LAMINATED GLASS

(71) Applicant: SEKISUI CHEMICAL CO., LTD., Osaka (JP)

(72) Inventors: Shougo Yoshida, Kouka (JP); Moyuru Okano, Kouka (JP); Yoshikazu Masuyama, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/651,081

(22) PCT Filed: Sep. 27, 2018

(86) PCT No.: PCT/JP2018/035930
§ 371 (c)(1),
(2) Date: Mar. 26, 2020

(87) PCT Pub. No.: WO2019/065837
PCT Pub. Date: Apr. 4, 2019

(65) Prior Publication Data
US 2020/0223190 A1    Jul. 16, 2020

(30) Foreign Application Priority Data

Sep. 27, 2017  (JP) .............................. JP2017-186537

(51) Int. Cl.
*B32B 17/10*   (2006.01)
*B32B 3/02*    (2006.01)
*B60J 1/02*    (2006.01)

(52) U.S. Cl.
CPC ........ *B32B 17/10559* (2013.01); *B32B 17/10* (2013.01); *B32B 17/10045* (2013.01);
(Continued)

(58) Field of Classification Search
CPC ........ B32B 17/10293; B32B 17/10302; B32B 3/02; B32B 17/10–1099;
(Continued)

(56) References Cited

U.S. PATENT DOCUMENTS 5,122,403 A * 6/1992 Roginski ........... B32B 17/10302
156/107
5,476,553 A * 12/1995 Hanoka ............. B32B 17/10743
156/107
(Continued)

FOREIGN PATENT DOCUMENTS

CN    104520097 A    4/2015
CN    105189400 A    12/2015
(Continued)

OTHER PUBLICATIONS

International Search Report for the Application No. PCT/JP2018/035930 dated Jan. 8, 2019.
(Continued)

*Primary Examiner* — Z. Jim Yang
(74) *Attorney, Agent, or Firm* — Cheng Law Group, PLLC

(57) ABSTRACT

Provided is a laminated glass capable of preventing breakage in an end part of the laminated glass under external impact. A laminated glass according to the present invention is a laminated glass including a first glass plate, a second glass plate, and an interlayer film, the interlayer film being arranged between the first glass plate and the second glass plate, the laminated glass having a portion where a lateral surface of the interlayer film is exposed, and a ratio of a weight of broken glass pieces determined by a ball drop test in a laminated glass after a dipping-light irradiation test, to a weight of broken glass pieces determined by the ball drop
(Continued)

test in a laminated glass not having undergone the dipping-light irradiation test being 2.5 or less.

14 Claims, 4 Drawing Sheets

(52) U.S. Cl.
CPC .. B32B 17/10165 (2013.01); B32B 17/10293 (2013.01); B32B 17/10302 (2013.01); B32B 2274/00 (2013.01); B32B 2309/105 (2013.01); B32B 2605/006 (2013.01); B60J 1/02 (2013.01)

(58) Field of Classification Search
CPC ..... Y10T 428/24777; B60J 1/00; B60J 1/001; B60J 1/02
See application file for complete search history.

(56) References Cited

U.S. PATENT DOCUMENTS

| | | | |
|---|---|---|---|
| 6,249,369 B1 | 6/2001 | Theiste et al. | |
| 6,720,082 B1 | 4/2004 | Hashimoto et al. | |
| 2001/0019759 A1* | 9/2001 | Barattucci | B32B 17/10348 428/192 |
| 2002/0018281 A1 | 2/2002 | Theiste et al. | |
| 2003/0096904 A1* | 5/2003 | Hakuta | C09D 123/16 524/588 |
| 2004/0032638 A1 | 2/2004 | Tonar et al. | |
| 2004/0061920 A1 | 4/2004 | Tonar et al. | |
| 2004/0218247 A1 | 11/2004 | Tonar et al. | |
| 2005/0270620 A1 | 12/2005 | Bauer et al. | |
| 2005/0270621 A1 | 12/2005 | Bauer et al. | |
| 2006/0056003 A1 | 3/2006 | Tonar et al. | |
| 2006/0245025 A1 | 11/2006 | Tonar et al. | |
| 2006/0245026 A1 | 11/2006 | Tonar et al. | |
| 2007/0024947 A1 | 2/2007 | Tonar et al. | |
| 2007/0201122 A1 | 8/2007 | Dozeman et al. | |
| 2007/0206263 A1 | 9/2007 | Neuman et al. | |
| 2008/0030836 A1 | 2/2008 | Tonar et al. | |
| 2008/0049295 A1 | 2/2008 | Tonar et al. | |
| 2008/0151350 A1 | 6/2008 | Tonar et al. | |
| 2008/0278793 A1 | 11/2008 | Tonar et al. | |
| 2008/0289682 A1* | 11/2008 | Adriani | B32B 17/10889 257/E31.13 |
| 2008/0291523 A1 | 11/2008 | Tonar et al. | |
| 2008/0302657 A1 | 12/2008 | Luten | |
| 2008/0310005 A1 | 12/2008 | Tonar et al. | |
| 2009/0207513 A1 | 8/2009 | Luten | |
| 2009/0303566 A1* | 12/2009 | Tonar | B60R 1/08 359/267 |
| 2010/0020380 A1 | 1/2010 | Tonar et al. | |
| 2010/0065116 A1* | 3/2010 | Stancel | B32B 27/38 136/256 |
| 2010/0071756 A1* | 3/2010 | Krajewski | B32B 27/08 136/251 |
| 2010/0126581 A1* | 5/2010 | Nishi | B32B 17/10788 228/101 |
| 2010/0215903 A1 | 8/2010 | Tonar et al. | |
| 2010/0246017 A1 | 9/2010 | Tonar et al. | |
| 2010/0275992 A1* | 11/2010 | Watanabe | H01L 31/18 257/E31.117 |
| 2010/0321758 A1 | 12/2010 | Bugno et al. | |
| 2011/0002028 A1 | 1/2011 | Luten | |
| 2011/0045280 A1* | 2/2011 | Varma | B32B 17/10302 428/428 |
| 2011/0080629 A1 | 4/2011 | Neuman et al. | |
| 2011/0317242 A1 | 12/2011 | Tonar et al. | |
| 2012/0026570 A1 | 2/2012 | Luten et al. | |
| 2012/0052310 A1 | 3/2012 | Keller et al. | |
| 2012/0086997 A1 | 4/2012 | Tonar et al. | |
| 2012/0092744 A1 | 4/2012 | Tonar et al. | |
| 2012/0092745 A1 | 4/2012 | Tonar et al. | |
| 2012/0103397 A1* | 5/2012 | Damm | B32B 17/10302 438/66 |
| 2012/0218618 A1 | 8/2012 | Tonar et al. | |
| 2012/0229882 A1 | 9/2012 | Fish, Jr. et al. | |
| 2012/0236387 A1 | 9/2012 | Bugno et al. | |
| 2012/0285536 A1* | 11/2012 | Ishiguro | H01L 31/0481 136/259 |
| 2012/0325396 A1 | 12/2012 | Toyama et al. | |
| 2013/0170013 A1 | 7/2013 | Tonar et al. | |
| 2013/0183507 A1* | 7/2013 | Matsuda | B32B 7/02 428/213 |
| 2013/0187017 A1 | 7/2013 | Roth | |
| 2013/0194650 A1 | 8/2013 | Roth et al. | |
| 2013/0323874 A1* | 12/2013 | Furihata | B32B 17/10871 438/64 |
| 2014/0036337 A1 | 2/2014 | Neuman et al. | |
| 2014/0071513 A1 | 3/2014 | Neuman et al. | |
| 2014/0126036 A1 | 5/2014 | Neuman et al. | |
| 2014/0139901 A1 | 5/2014 | Tonar et al. | |
| 2015/0124308 A1 | 5/2015 | Neuman et al. | |
| 2015/0239399 A1 | 8/2015 | Tonar et al. | |
| 2015/0298431 A1* | 10/2015 | Von Der Weiden | B32B 17/10174 156/306.6 |
| 2015/0329054 A1 | 11/2015 | Neuman et al. | |
| 2016/0097959 A1 | 4/2016 | Bruizeman et al. | |
| 2016/0214352 A1 | 7/2016 | Yoshida et al. | |
| 2016/0214354 A1 | 7/2016 | Yoshida et al. | |
| 2016/0243773 A1* | 8/2016 | Wang | B32B 17/10513 |
| 2016/0250825 A1* | 9/2016 | Cleary | B32B 17/10137 428/215 |
| 2017/0005215 A1* | 1/2017 | Wang | H02S 30/10 |
| 2017/0028687 A1 | 2/2017 | Derosa et al. | |
| 2017/0068143 A1 | 3/2017 | Bruizeman et al. | |
| 2017/0072665 A1 | 3/2017 | Iwamoto et al. | |
| 2017/0182745 A1 | 6/2017 | Iwamoto et al. | |
| 2017/0182746 A1 | 6/2017 | Iwamoto et al. | |
| 2017/0182747 A1 | 6/2017 | Iwamoto et al. | |
| 2017/0182748 A1 | 6/2017 | Iwamoto et al. | |
| 2017/0197395 A1 | 7/2017 | Iwamoto et al. | |
| 2017/0217132 A1 | 8/2017 | Iwamoto et al. | |
| 2017/0246842 A1 | 8/2017 | Iwamoto et al. | |
| 2017/0261830 A1 | 9/2017 | Luten et al. | |
| 2017/0313033 A1 | 11/2017 | Iwamoto et al. | |
| 2018/0001598 A1 | 1/2018 | Mikayama et al. | |
| 2018/0001599 A1 | 1/2018 | Mikayama et al. | |
| 2018/0216222 A1 | 8/2018 | Neuman et al. | |
| 2019/0143647 A1 | 5/2019 | Von Der Weiden et al. | |
| 2019/0224948 A1* | 7/2019 | Frebourg | B32B 17/10761 |
| 2020/0094529 A1 | 3/2020 | Iwamoto et al. | |

FOREIGN PATENT DOCUMENTS

| | | |
|---|---|---|
| CN | 105813840 A | 7/2016 |
| EP | 1 228 861 A1 | 8/2002 |
| EP | 1 698 600 A1 | 9/2006 |
| EP | 3 219 686 A1 | 9/2017 |
| JP | 5-62539 U | 8/1993 |
| JP | 2001-64045 A | 3/2001 |
| JP | 2003-327454 A | 11/2003 |
| JP | 2006-526176 A | 11/2006 |
| JP | 2011-11941 A | 1/2011 |
| JP | 2015-531701 A | 11/2015 |
| JP | 2016-8161 A | 1/2016 |
| JP | 2016-539890 A | 12/2016 |
| WO | WO-2015/147302 A1 | 10/2015 |
| WO | WO-2016/039477 A1 | 3/2016 |
| WO | WO-2016/158696 A1 | 10/2016 |
| WO | WO-2017/023644 A2 | 2/2017 |

OTHER PUBLICATIONS

International Preliminary Report on Patentability (PCT/IPEA/409) for Application No. b PCT/JP2018/035930 dated Oct. 17, 2019.
Written Opinion of the International Searching Authority (PCT/ISA/237) for Application No. PCT/JP2018/035930 dated Jan. 8, 2019.

(56) References Cited

OTHER PUBLICATIONS

Technical Manual of Vehicle Test (I), Edited by Changchun Automobile Research Institute, 1st Edition in Aug. 1993, Jilin Science & Technology Publishing House, pp. 647-651.

The First Office Action for the Application No. 201880062130.4 from the State Intellectual Property Office of the People's Republic of China dated Nov. 24, 2021.

Supplementary European Search Report for the Application No. EP 18 862 005.8 dated May 20, 2021.

Notification of Reasons for Refusal for the Application No. 2018-552015 from Japan Patent Office dated Apr. 26, 2022.

* cited by examiner

[FIG. 1]
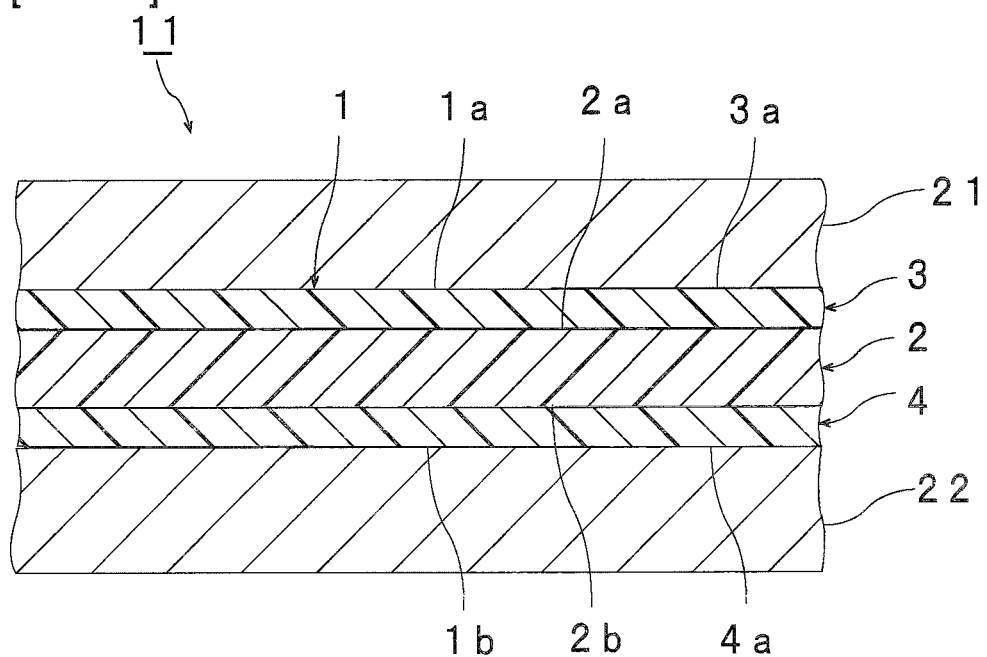
[FIG. 2]
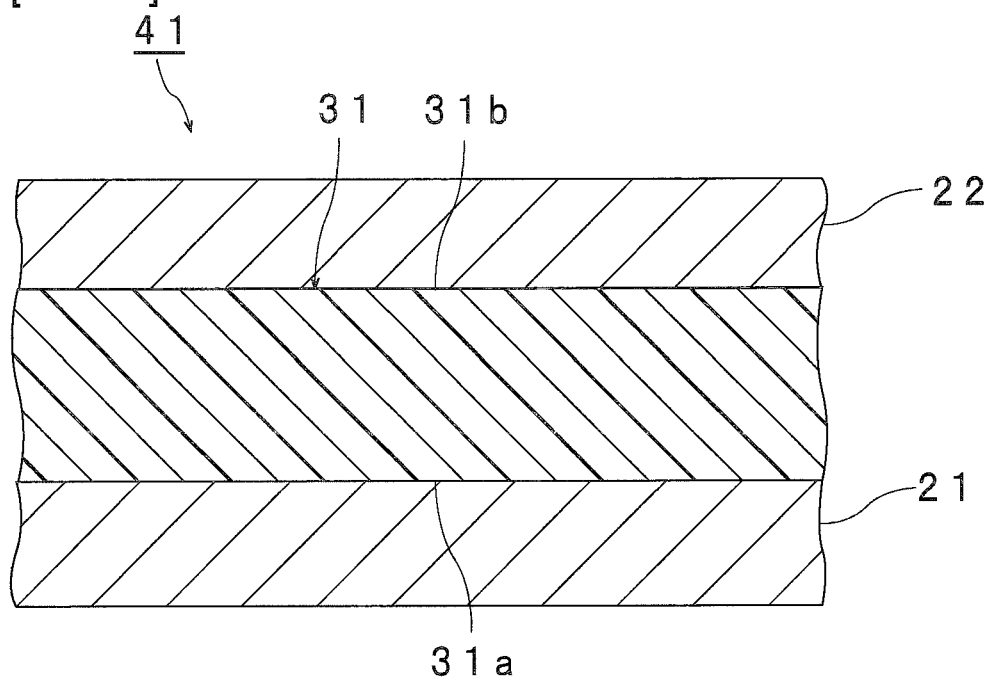

[FIG. 3]
(a)
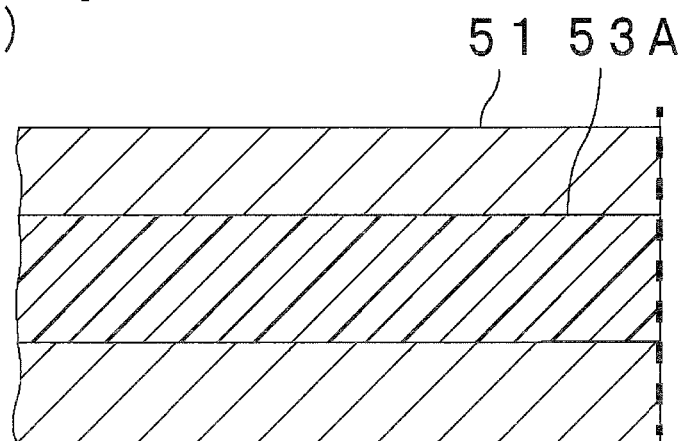
(b)
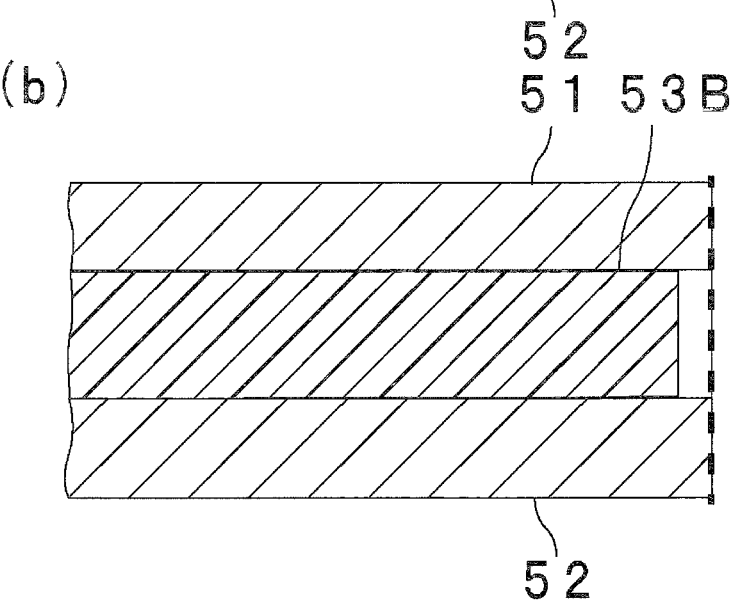
(c)
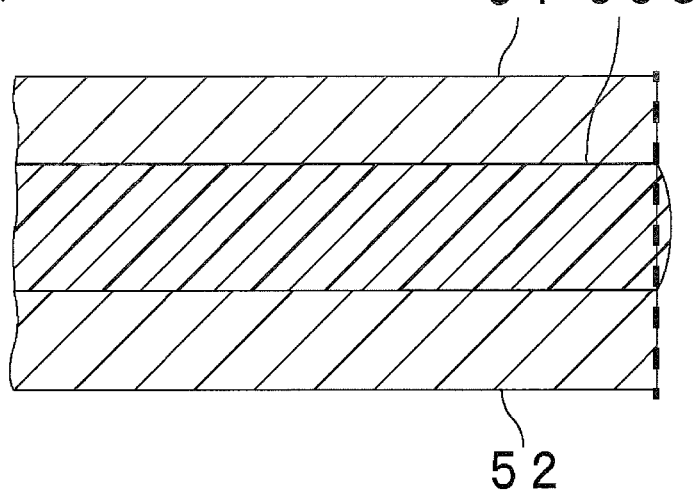

[FIG. 4]
(a)
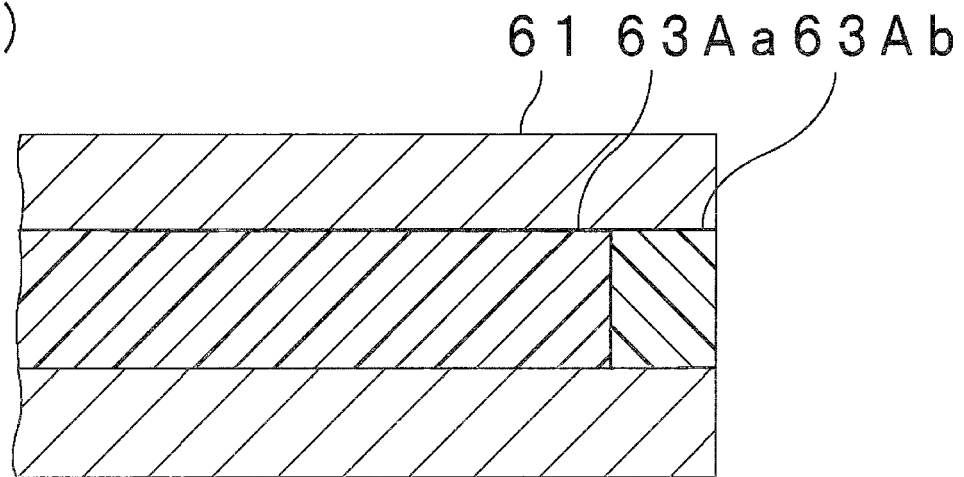
(b)
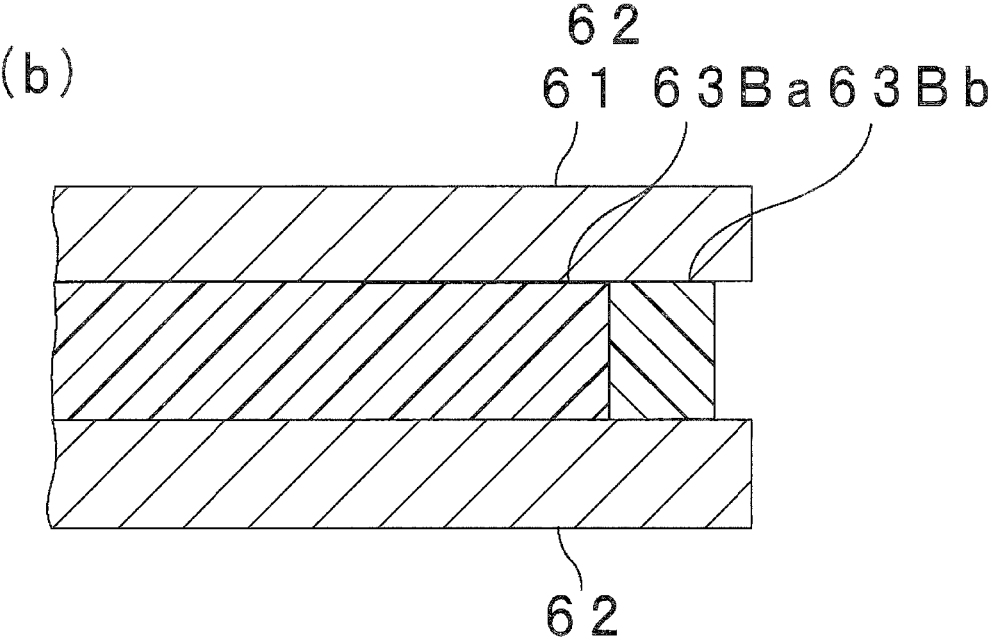

[FIG. 5]
(a)
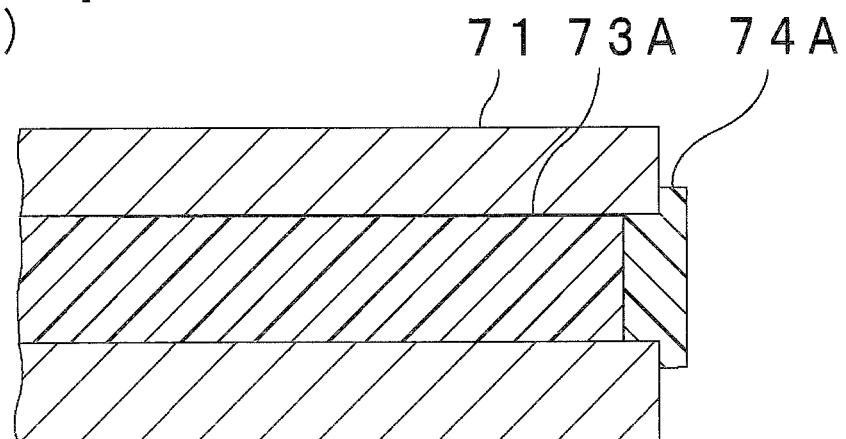
(b)
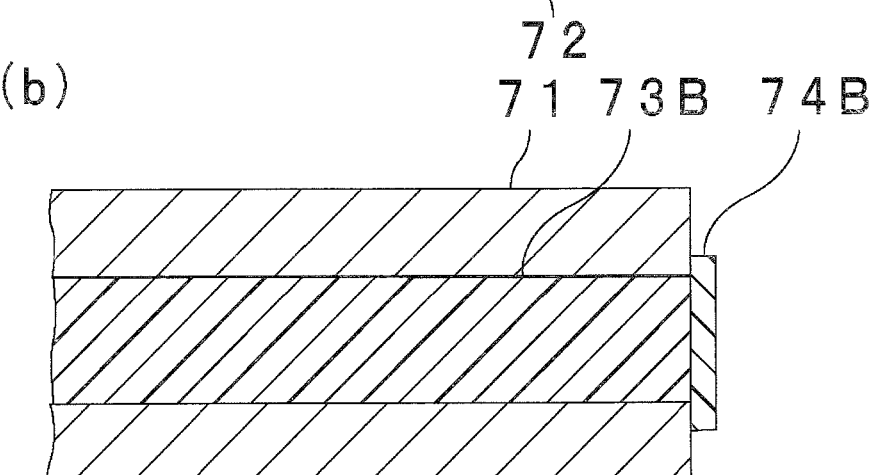
(c)
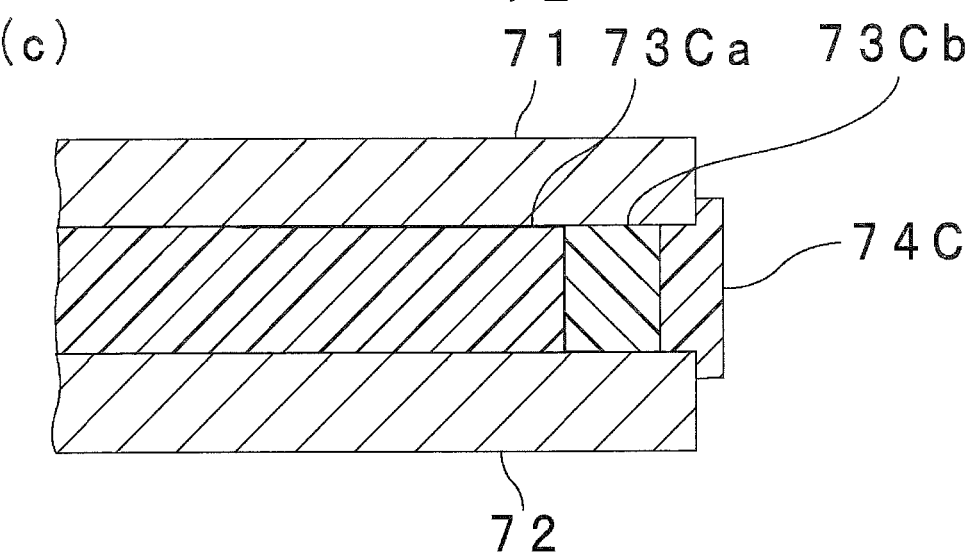

LAMINATED GLASS

TECHNICAL FIELD

The present invention relates to a laminated glass in which an interlayer film is sandwiched between a pair of glass plates.

BACKGROUND ART

Since laminated glass generates only a small amount of scattering glass fragments even when subjected to external impact and broken, the laminated glass is excellent in safety. As such, the laminated glass is widely used for automobiles, railway vehicles, aircraft, ships, buildings and the like. The laminated glass is produced by sandwiching an interlayer film between a pair of glass plates.

As one example of the laminated glass, the following Patent Document 1 discloses laminated glass having an interlayer film containing a polyvinyl acetal resin, an ultraviolet absorber, a plasticizer, an adhesive force regulator, and an oxidation inhibitor. The ultraviolet absorber used in the interlayer film is a malonic ester compound and/or an oxanilide compound.

The following Patent Document 2 discloses laminated glass having an interlayer film having low yellowing tendency, high transmittance to UV-A rays and visible light, and low transmittance to UV-B rays. The interlayer film contains a polyvinyl acetal, a plasticizer, and an oxanilide type compound which is an UV absorber.

RELATED ART DOCUMENT

Patent Document

Patent Document 1: JP 2003-327454 A
Patent Document 2: US 2012/0052310 A1

SUMMARY OF THE INVENTION

Problems to be Solved by the Invention

For example, in a laminated glass of an automobile, a small stone or the like can collide with an end part or with the vicinity of the end part of the laminated glass during travel. In a conventional laminated glass, there is a problem that an end part of the laminated glass breaks and the broken glass pieces are likely to scatter when a small stone or the like collides with an end part or with the vicinity of the end part of the laminated glass. The impact on the laminated glass of the automobile can occur not only from the exterior side but also from the interior side, for example, at the time of occurrence of an accident.

In recent years, thin glass plates have been used in association with the reduction in weight of automobiles. When thin glass plates are used, there is a problem that breakage in an end part of a laminated glass is more likely to occur under external impact.

Recently, in automobiles, a laminated glass is more often used in the condition that an end part or the vicinity of the end part of the laminated glass is exposed. There is a problem that breakage in an end part of the laminated glass is more likely to occur under external impact on an end part or the vicinity of the end part of the exposed laminated glass.

An object of the present invention is to provide a laminated glass capable of preventing breakage in an end part of the laminated glass under external impact.

Means for Solving the Problems

According to a broad aspect of the present invention, there is provided a laminated glass including a first glass plate, a second glass plate, and an interlayer film, the interlayer film being arranged between the first glass plate and the second glass plate, the first glass plate having a thickness that is equal to a thickness of the second glass plate, or smaller than the thickness of the second glass plate, the laminated glass having a portion where a lateral surface of the interlayer film is exposed, a ratio of a weight of broken glass pieces determined by a ball drop test in a laminated glass after a dipping-light irradiation test, to a weight of broken glass pieces determined by the ball drop test in a laminated glass not having undergone the dipping-light irradiation test being 2.5 or less.

The dipping-light irradiation test includes conducting a process of: dipping a laminated glass before the dipping-light irradiation test in pure water at 80° C. for 24 hours; removing the laminated glass from the pure water; wiping off water of the laminated glass; leaving the laminated glass to stand at 23° C. for 4 hours; and subjecting the laminated glass to irradiation with xenon light for 144 hours at a black panel temperature of 83° C., a temperature inside a vessel of 53° C. and a humidity of 50% RH. The laminated glass after the dipping-light irradiation test is obtained by conducting 15 cycles of the process. The irradiation with xenon light is conducted with an irradiance of 180 W/m$^2$, a wavelength for measuring the irradiance of 300 to 400 nm, an inner filter of quartz, and an outer filter of quartz: #275 (cutoff 275 nm).

The ball drop test includes: storing each of a laminated glass not having undergone the dipping-light irradiation test and a laminated glass after the dipping-light irradiation test at 23±2° C. and at a humidity of 50% RH for 4 hours; and dropping a ball for each of the laminated glasses after the storing, the ball being an iron ball having a diameter of 1.5 inches and a weight of 229 g from a height of 30 cm on a side of the first glass plate at a position of 0.5 mm inwardly from a lateral surface of the laminated glass in the portion where the lateral surface of the interlayer film is exposed. The dropping of the ball is conducted under an atmosphere at 23±2° C. and a humidity of 50% RH. The weight of broken glass pieces determined by the ball drop test is obtained by measuring a weight of broken glass pieces released from the interlayer film.

In a specific aspect of the laminated glass according to the present invention, the interlayer film has a one-layer structure or a two or more-layer structure and the interlayer film includes a first layer containing a thermoplastic resin.

In a specific aspect of the laminated glass according to the present invention, the interlayer film has a two or more-layer structure, the interlayer film includes a second layer containing a thermoplastic resin, and the second layer is arranged on a first surface side of the first layer.

In a specific aspect of the laminated glass according to the present invention, the interlayer film has a three or more-layer structure, the interlayer film includes a third layer containing a thermoplastic resin, and the third layer is arranged on a second surface side opposite to the first surface of the first layer.

In a specific aspect of the laminated glass according to the present invention, the thermoplastic resin in the first layer is a polyvinyl acetal resin, an ionomer resin or an ethylene-vinyl acetate copolymer resin, or the thermoplastic resin in the first layer is a thermoplastic elastomer.

In a specific aspect of the laminated glass according to the present invention, the first glass plate has a thickness of 1.9 mm or less.

In a specific aspect of the laminated glass according to the present invention, the first glass plate is a tempered glass plate.

In a specific aspect of the laminated glass according to the present invention, black coating is not applied on an adhesion surface between an end part of the interlayer film and an end part of the first glass plate in the portion where the lateral surface of the interlayer film is exposed in the laminated glass, and black coating is not applied on an adhesion surface between an end part of the interlayer film and an end part of the second glass plate in the portion where the lateral surface of the interlayer film is exposed in the laminated glass.

In a specific aspect of the laminated glass according to the present invention, the laminated glass is used as glass for windshield in automobiles.

In a specific aspect of the laminated glass according to the present invention, the laminated glass is used as side glass, roof glass or glass for backlight in automobiles.

Effect of the Invention

The laminated glass according to the present invention is a laminated glass including a first glass plate, a second glass plate, and an interlayer film. In the laminated glass according to the present invention, the interlayer film is arranged between the first glass plate and the second glass plate. In the laminated glass according to the present invention, the thickness of the first glass plate is equal to the thickness of the second glass plate or smaller than the thickness of the second glass plate. In the laminated glass according to the present invention, there is a portion where a lateral surface of the interlayer film is exposed. In the present invention, a ratio of a weight of broken glass pieces determined by a ball drop test in a laminated glass after a dipping-light irradiation test, to a weight of broken glass pieces determined by the ball drop test in a laminated glass not having undergone the dipping-light irradiation test is 2.5 or less. Since the laminated glass according to the present invention has the above configuration, it is possible to prevent breakage in an end part of the laminated glass under external impact.

BRIEF DESCRIPTION OF DRAWINGS

FIG. 1 is a sectional view schematically showing laminated glass in accordance with a first embodiment of the present invention.

FIG. 2 is a sectional view schematically showing laminated glass in accordance with a second embodiment of the present invention.

FIGS. 3(a), (b) and (c) are views for illustrating a lateral surface of laminated glass.

FIGS. 4(a) and (b) are views for illustrating an interlayer film of laminated glass.

FIGS. 5(a), (b) and (c) are views for illustrating an interlayer film of laminated glass.

MODE(S) FOR CARRYING OUT THE INVENTION

Hereinafter, the present invention will be described in detail.

A laminated glass according to the present invention includes a first glass plate, a second glass plate, and an interlayer film. The interlayer film is arranged between the first glass plate and the second glass plate.

In the laminated glass according to the present invention, the thickness of the first glass plate is equal to the thickness of the second glass plate or smaller than the thickness of the second glass plate. In the laminated glass according to the present invention, there is a portion where a lateral surface of the interlayer film is exposed.

In the present invention, a ratio of a weight of broken glass pieces determined by a ball drop test in a laminated glass after a dipping-light irradiation test, to a weight of broken glass pieces determined by the ball drop test in a laminated glass not having undergone the dipping-light irradiation test is 2.5 or less. The weight of broken glass pieces in the ball drop test in the laminated glass not having undergone a dipping-light irradiation test is also described as weight A before dipping-light irradiation test. The weight of broken glass pieces in the ball drop test in the laminated glass after the dipping-light irradiation test is also described as weight B after dipping-light irradiation test. The above ratio is a ratio (weight B after dipping-light irradiation test)/(weight A before dipping-light irradiation test).

The dipping-light irradiation test includes conducting a process of: dipping a laminated glass before the dipping-light irradiation test in pure water at 80° C. for 24 hours; removing the laminated glass from the pure water; wiping off water of the laminated glass; leaving the laminated glass to stand at 23° C. for 4 hours; and subjecting the laminated glass to irradiation with xenon light for 144 hours at a black panel temperature of 83° C., a temperature inside a vessel of 53° C. and a humidity of 50% RH. The laminated glass after the dipping-light irradiation test is obtained by conducting 15 cycles of the process. The irradiation with xenon light is conducted with an irradiance of 180 W/m$^2$, a wavelength for measuring the irradiance of 300 to 400 nm, an inner filter of quartz, and an outer filter of quartz: #275 (cutoff 275 nm).

The ball drop test includes: storing each of a laminated glass not having undergone the dipping-light irradiation test and a laminated glass after the dipping-light irradiation test at 23±2° C. and at a humidity of 50% RH for 4 hours; and dropping a ball for each of the laminated glasses after the storing, the ball being an iron ball having a diameter of 1.5 inches and a weight of 229 g from a height of 30 cm on a side of the first glass plate at a position of 0.5 mm inwardly from a lateral surface of the laminated glass in the portion where the lateral surface of the interlayer film is exposed. The dropping of the ball is conducted under an atmosphere at 23±2° C. and a humidity of 50% RH. The weight of broken glass pieces determined by the ball drop test is obtained by measuring a weight of broken glass pieces released from the interlayer film.

Since the laminated glass according to the present invention has the above configuration, it is possible to prevent breakage in an end part of the laminated glass under external impact. For example, it is possible to prevent breakage of the laminated glass in the region to the position of 5 cm inwardly from the lateral surface of the laminated glass. In particular, it is possible to prevent breakage of the laminated glass in the region to the position of 1 cm inwardly from the lateral surface of the laminated glass.

In a laminated glass of an automobile, a small stone or the like can collide with an end part of the laminated glass during travel. In the laminated glass according to the present invention, the laminated glass is difficult to be broken when a small stone or the like collides with an end part of the laminated glass, so that it is possible to reduce the scattering amount of broken glass pieces.

Recently, in automobiles, a laminated glass is more often used in the condition that an end part or the vicinity of the end part of the laminated glass is exposed. There is a problem that breakage in an end part of the laminated glass is more likely to occur under external impact on an end part or the vicinity of the end part of the exposed laminated glass.

In contrast to this, since the present invention has the aforementioned configuration, it is possible to prevent breakage of the laminated glass in an end part even when a small stone or the like collides with an end part of the laminated glass, or an external impact is exerted on an end part or the vicinity of the end part of the exposed laminated glass.

Whether a certain broken glass piece is released from the interlayer film is determined by examining whether the broken glass piece drops when the glass plate of the side on which the iron ball drops is turned down at 23±2° C. and a humidity of 50% RH after the ball drop test.

In the ball drop test, two or more test laminated glasses having a size of 8 cm long×7 cm wide are prepared. This size is smaller than the size of a commonly used laminated glass. From one laminated glass, two or more test laminated glasses are cut out.

The test laminated glass is cut out to have a portion where a lateral surface of the interlayer film is exposed on the side of one side of the test laminated glass. Among two or more test laminated glasses, one or more glasses are used for the ball drop test for a laminated glass not having undergone a dipping-light irradiation test, and the remaining one or more glasses are used for the ball drop test for a laminated glass after the dipping-light irradiation test.

When the two glass plates (the first glass plate and the second glass plate) have different thicknesses, a ratio when the iron ball is dropped on the thinner first glass plate side in the ball drop test is employed as a numerical ratio (weight B after dipping-light irradiation test)/(weight A after dipping-light irradiation test) regardless of whether the laminated glass is curved.

When the two glass plates (the first glass plate and the second glass plate) have equal thickness, and the two glass plates are the same in kind, a ratio when the iron ball is dropped on one glass plate side in the ball drop test may be employed as a numerical ratio (weight B after dipping-light irradiation test)/(weight A after dipping-light irradiation test) regardless of whether the laminated glass is curved. Also, an average of a ratio when the iron ball is dropped on one glass plate side, and a ratio when the iron ball is dropped on the other glass plate side is determined, and the average may be employed as a numerical ratio (weight B after dipping-light irradiation test)/(weight A after dipping-light irradiation test). It is preferred that an average of a ratio when the iron ball is dropped on one glass plate side, and a ratio when the iron ball is dropped on the other glass plate side be determined, and the average be employed as a numerical ratio (weight B after dipping-light irradiation test)/(weight A after dipping-light irradiation test).

When the two glass plates (the first glass plate and the second glass plate) have equal thickness, and the two glass plates are different in kind, an average of a ratio when the iron ball is dropped on one glass plate side in the ball drop test and a ratio when the iron ball is dropped on the other glass plate side is determined. This average is employed as a numerical ratio (weight B after dipping-light irradiation test)/(weight A before dipping-light irradiation test).

The ratio (weight B after dipping-light irradiation test)/(weight A before dipping-light irradiation test) is preferably 2.4 or less, more preferably 2.3 or less, still more preferably 2.2 or less, further preferably 2.1 or less, still further preferably 2.0 or less, especially preferably 1.9 or less, more especially preferably 1.8 or less, most preferably 1.7 or less. When the ratio is the aforementioned upper limit or less, it is possible to further prevent breakage in an end part of the laminated glass under external impact. There is a tendency that the weight B after dipping-light irradiation test is generally larger than the weight A before dipping-light irradiation test. From the viewpoint of further heightening the penetration resistance, the ratio (weight B after dipping-light irradiation test)/(weight A before dipping-light irradiation test) may be 0.5 or more, 0.6 or more, 0.7 or more, 0.8 or more, 0.9 or more, 1.0 or more.

Examples of the method for achieving the ratio (weight B after dipping-light irradiation test)/(weight A before dipping-light irradiation test) of the aforementioned upper limit or less include a method of obtaining an interlayer film by injecting a thermosetting agent and a method of obtaining an interlayer film by injecting a UV curing agent. It is preferred that injection of the thermosetting agent or the UV curing agent be carried out in an end part of the interlayer film before injection.

From the viewpoint of further preventing breakage in an end part of the laminated glass under external impact, the weight B after dipping-light irradiation test is preferably 50 g or less, more preferably 30 g or less, further preferably 15 g or less. From the viewpoint of further heightening the penetration resistance, the weight B after dipping-light irradiation test may be 0.1 g or more, 0.5 g or more, 1 g or more.

The lateral surface of the laminated glass means a lateral surface in the portion where the first glass plate and the second glass plate are opposed to each other. (See FIGS. 3($a$), ($b$) and ($c$) illustrating laminated glass. The position of the broken line indicates an end part of the laminated glass. Reference numerals: first glass plate 51, second glass plate 52, interlayer films 53A, 53B, 53C.)

Apart from the interlayer film body, it is sometimes the case that a covering part having a composition different from the composition of the interlayer film body is formed to cover the interlayer film body. In the case where the covering part that covers the interlayer film body is formed, the covering part is also included in the interlayer film when the covering part is aligned with the portion where the first glass plate and the second glass plate are opposed to each other, or the covering part is positioned inside the opposed part. In the laminated glass having the covering part, it can be mentioned that "there is a portion where a lateral surface of the interlayer film is exposed" by the lateral surface of the covering part (part of the interlayer film). (See FIGS. 4($a$) and ($b$) illustrating laminated glass. Reference numeral: first glass plate 61, second glass plate 62, interlayer film body 63Aa, 63Ba (part of interlayer film), covering part 63Ab, 63Bb (part of interlayer film)).

In the case where the covering part that covers the interlayer film is formed, the covering part is not included in the interlayer film when the covering part has a part that protrudes laterally from the portion where the first glass plate and the second glass plate are opposed to each other. In the laminated glass in which the entire lateral surface of the interlayer film is covered by the covering part (not being a part of the interlayer film), it cannot be mentioned that "there is a portion where a lateral surface of the interlayer film is exposed". (See FIGS. 5($a$), ($b$) and ($c$) illustrating laminated glass. Reference numeral: first glass plate 71, second glass plate 72, interlayer film body 73A, 73B, 73Ca

(part of interlayer film), covering part 73Cb (part of interlayer film), covering part 74A, 74B, 74C (not being a part of the interlayer film)).

When the interlayer film has a one-layer (first layer) structure, the layer being in contact with the glass plate is the interlayer film (first layer). When the interlayer film has a two-layer structure including a first layer and a second layer, the layer being in contact with the glass plate is the first layer and the second layer, namely, the first layer being in contact with the first glass plate and the second layer being in contact with the second glass plate. When the interlayer film has a three-layer structure including a second layer, a first layer and a third layer, the layer being in contact with the glass plate is the second layer and the third layer, namely, the second layer being in contact with the first glass plate and the third layer being in contact with the second glass plate.

In the laminated glass, there is a portion where a lateral surface of the interlayer film is exposed. It is preferred that in an end part of the laminated glass, there be a portion where the lateral surface of the interlayer film is exposed. In the laminated glass, there may be a portion where a lateral surface of the interlayer film is not exposed. In an end part of the laminated glass, there may be a portion where a lateral surface of the interlayer film is exposed and a portion where a lateral surface of the interlayer film is not exposed.

From the viewpoint of heightening the transparency of the laminated glass, the visible light transmittance of the laminated glass is preferably 70% or more, more preferably 80% or more, further preferably 90% or more.

The visible light transmittance is measured at a wavelength ranging from 380 to 780 nm by using a spectrophotometer ("U-4100" available from Hitachi High-Tech Science Corporation) in conformity with JIS R3211:1998.

Hereinafter, specific embodiments of the present invention will be described with reference to the drawings.

FIG. 1 is a sectional view schematically showing laminated glass in accordance with a first embodiment of the present invention.

A laminated glass 11 shown in FIG. 1 includes a first glass plate 21, a second glass plate 22, and an interlayer film 1. The interlayer film 1 is arranged between the first glass plate 21 and the second glass plate 22, to be sandwiched therebetween.

The first glass plate 21 is layered on a first surface 1a of the interlayer film 1. The second glass plate 22 is layered on a second surface 1b opposite to the first surface 1a of the interlayer film 1. The first glass plate 21 is layered on an outer surface 3a of the second layer 3 of the interlayer film 1. The second glass plate 22 is layered on an outer surface 4a of the third layer 4 of the interlayer film 1.

The interlayer film 1 is a multi-layered interlayer film having a two or more-layer structure. The interlayer film 1 includes a first layer 2, the second layer 3 arranged on a first surface 2a side of the first layer 2, and a third layer 4 arranged on a second surface 2b side opposite to the first surface 2a of the first layer 2. The second layer 3 is layered on the first surface 2a of the first layer 2. The third layer 4 is layered on the second surface 2b of the first layer 2. The first layer 2 is an intermediate layer. Each of the second layer 3 and the third layer 4 is, for example, a protective layer and is a surface layer in the present embodiment. The first layer 2 is arranged between the second layer 3 and the third layer 4 to be sandwiched therebetween. Accordingly, the interlayer film 1 has a multilayer structure in which the second layer 3, the first layer 2, and the third layer 4 are arranged in this order. In the interlayer film 1, the second layer 3, the first layer 2, and the third layer 4 are arranged and layered in this order.

It is preferred that an outer surface on the opposite side of the first layer side of the second layer be a surface on which a glass plate is laminated. It is preferred that an outer surface on the opposite side of the first layer side of the third layer be a surface on which a glass plate is laminated.

In this connection, other layers may be arranged between the first layer 2 and the second layer 3 and between the first layer 2 and the third layer 4, respectively. It is preferred that the first layer 2 and the second layer 3, and the first layer 2 and the third layer 4 be directly layered. Examples of the other layer include layers containing a thermoplastic resin such as a polyvinyl acetal resin, and layers containing, for example, polyethylene terephthalate.

The interlayer film 1 contains a thermoplastic resin. The first layer 2 contains a thermoplastic resin. The second layer 3 contains a thermoplastic resin. The third layer 4 contains a thermoplastic resin.

FIG. 2 is a sectional view schematically showing laminated glass in accordance with a second embodiment of the present invention.

A laminated glass 41 shown in FIG. 2 includes a first glass plate 21, a second glass plate 22, and an interlayer film 31. The interlayer film 31 is arranged between the first glass plate 21 and the second glass plate 22, to be sandwiched therebetween. The first glass plate 21 is layered on a first surface 31a of the interlayer film 31. The second glass plate 22 is layered on a second surface 31b opposite to the first surface 31a of the interlayer film 31.

The interlayer film 31 is a single-layered interlayer film having a one-layer structure. The interlayer film 31 is a first layer. The interlayer film 31 contains a thermoplastic resin.

The interlayer film has a one-layer structure or a two or more-layer structure. The interlayer film may have a one-layer structure and may have a two or more-layer structure. The interlayer film may have a two-layer structure and may have a three or more-layer structure. The interlayer may be an interlayer film having a one-layer structure including only a first layer (single-layered interlayer film) and may be an interlayer film having two or more-layer structure including a first layer and other layer (multi-layered interlayer film).

Hereinafter, the details of the first layer (including a single-layered interlayer film), the second layer, and the third layer which constitute the interlayer film, and the details of each ingredient contained in the first layer, the second layer, and the third layer will be described.

(Thermoplastic Resin)

The interlayer film contains a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). The thermoplastic resin (1), the thermoplastic resin (2), and the thermoplastic resin (3) may be the same or different from one another. For still higher sound insulating properties, it is preferred that the thermoplastic resin (1) be different from the thermoplastic resin (2) and the thermoplastic resin (3). Each of the polyvinyl acetal resin (1), the polyvinyl acetal resin (2) and the polyvinyl acetal resin (3) may be the same or different from one another. For still higher sound insulating properties, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), and the thermoplastic resin (3) may be used alone and two or more kinds thereof may be used in combination. One kind of each of the polyvinyl acetal resin (0), the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, an ionomer resin, a polyvinyl alcohol resin, and the like. Thermoplastic resins other than these may be used.

The thermoplastic resins exemplified above can be a thermoplastic elastomer by adjusting the molecular structure, the polymerization degree and the like of the resin.

The thermoplastic resin means a resin that softens and exhibits plasticity when it is heated, and hardens when it is cooled to room temperature (25° C.). Among the thermoplastic resins, especially the thermoplastic elastomer means a resin that softens and exhibits plasticity when it is heated, and hardens to exhibits rubber elasticity when it is cooled to room temperature (25° C.).

From the viewpoint of further preventing breakage in an end part of the laminated glass under external impact, it is preferred that the thermoplastic resin be a polyvinyl acetal resin, an ionomer resin or an ethylene-vinyl acetate copolymer resin, or the thermoplastic resin be a thermoplastic elastomer. It is preferred that the thermoplastic resin (1) in the first layer be a preferred thermoplastic resin as described above. It is preferred that each of thermoplastic resin (2) in the second layer and the thermoplastic resin (2) in the second layer be a preferred thermoplastic resin as described above. In this case, the thermoplastic resin is a polyvinyl acetal resin, an ionomer resin or an ethylene-vinyl acetate copolymer resin, and the thermoplastic resin may be a thermoplastic elastomer. The thermoplastic resin may be a polyvinyl acetal resin, an ionomer resin or an ethylene-vinyl acetate copolymer resin, and the thermoplastic resin may be a thermoplastic elastomer.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

From the viewpoint of further preventing breakage in an end part of the laminated glass under external impact, it is preferred that the interlayer film contain a polyvinyl butyral resin or an ionomer resin. From the viewpoint of further preventing breakage in an end part of the laminated glass under external impact, it is preferred that the polyvinyl acetal resin be a polyvinyl butyral resin. From the viewpoint of further preventing breakage in an end part of the laminated glass under external impact, the ionomer resin be a polyvinyl acetal ionomer resin.

The polyvinyl acetal ionomer resin is an ionomerized polyvinyl acetal resin. It is preferred that the polyvinyl acetal ionomer resin contain polyvinyl acetal into which an acid group is introduced.

The polyvinyl acetal ionomer resin has, for example, a $—CH_2—CH—$ group in a main chain. The polyvinyl acetal ionomer resin has a polyvinyl acetal skeleton. The polyvinyl acetal skeleton has a $—CH_2—CH—$ group in a main chain. To the carbon atom in the "$—CH—$" moiety in a $—CH_2—CH—$ group, another group is bound. In the polyvinyl acetal ionomer resin, it is preferred that $—CH_2—CH—$ groups be consecutive in the main chain.

For neutralization in obtaining the polyvinyl acetal ionomer resin, metal is used. From the viewpoint of effectively heightening the shock resistance at low temperature and the self-repairability, the metal is preferably Na, Li, K, Mg, Zn, Cu, Co, Al, Fe, Ni, Cr or Mn. It is preferred that the metal contain, in particular, Na.

Examples of the method for producing the polyvinyl acetal ionomer resin include the following method. Method of copolymerizing polyvinyl acetate and a monomer having a group capable of becoming an ionic functional group, saponifying, and acetalizing with aldehyde, followed by ionomerization. Method of acetalizing polyvinyl alcohol (PVA) with an aldehyde having a group capable of becoming an ionic functional group, followed by ionomerization. Method of acetalizing polyvinyl acetal with an aldehyde having a group capable of becoming an ionic functional group, followed by ionomerization.

Examples of the method for ionomerization include a method of adding a metal-containing compound into a solution, and a method of adding a metal-containing compound during kneading. The metal-containing compound may be added in a state of a solution.

It is preferred that the ionic functional group be a carboxyl group, a base of carboxyl group, a sulfonic acid group, a base of sulfonic acid group, a sulfinic acid group, a base of sulfinic acid group, a sulfenic acid group, a base of sulfenic acid group, a phosphoric acid group, a base of phosphoric acid group, a phosphonic acid group, a base of phosphonic acid group, an amino group, or a base of amino group. In this case, the effect of ionomerization effectively appears.

From the viewpoint of effectively heightening the shock resistance at low temperature and the self-repairability, the polyvinyl acetal ionomer resin has a content of the ionic functional group of preferably 20% by mole or less, more preferably 10% by mole or less, further preferably 5% by mole or less.

The content of the ionic functional group means a sum of a percentage of the group that can become an ionic functional group in the resin, and a percentage of the ionic functional group constituting the metal salt of the ionic functional group. The content of the ionic functional group can be determined by using NMR or the like. For example, the content of the ionic functional group can be calculated from an integrated value of the peak originated from the ionic functional group (appearing around 45 ppm in the carboxyl group) and the peak originated from the main chain appearing around 30 ppm in carbon NMR.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, preferably 5000 or less, more preferably 4000 or less and further preferably 3500 or less.

When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is preferably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. The aldehyde is preferably propionaldehyde, n-butyraldehyde, isobutyraldehyde, n-hexylaldehyde, or n-valeraldehyde, more preferably propionaldehyde, n-butyraldehyde, or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin (0) is preferably 15% by mole or more and more preferably 18% by mole or more and is preferably 40% by mole or less and more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

A content of the hydroxyl group (the amount of hydroxyl groups) of the polyvinyl acetal resin (1) is preferably 17% by mole or more, more preferably 20% by mole or more, further preferably 22% by mole or more and is preferably 28% by mole or less, more preferably 27% by mole or less, further preferably 25% by mole or less, especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating property of laminated glass is further enhanced. Moreover, when the content of the hydroxyl group is the above upper limit or less, the flexibility of the interlayer film is enhanced and the handling of the interlayer film is facilitated.

Each of the contents of the hydroxyl group of the polyvinyl acetal resin (2) and the polyvinyl acetal resin (3) is preferably 25% by mole or more, more preferably 28% by mole or more, more preferably 30% by mole or more, still more preferably 31.5% by mole or more, further preferably 32% by mole or more, especially preferably 33% by mole or more. Each of the contents of the hydroxyl group of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

From the viewpoint of further heightening the sound insulating properties, it is preferred that the content of the hydroxyl group of the polyvinyl acetal resin (1) be lower than the content of the hydroxyl group of the polyvinyl acetal resin (2). From the viewpoint of further enhancing the sound insulating properties, it is preferred that the content of the hydroxyl group of the polyvinyl acetal resin (1) be lower than the content of the hydroxyl group of the polyvinyl acetal resin (3). From the viewpoint of still further enhancing the sound insulating properties, the absolute value of a difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, most preferably 12% by mole or more. From the viewpoint of still further enhancing the sound insulating properties, the absolute value of a difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, most preferably 12% by mole or more. The absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) are preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less.

When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is excellent in penetration resistance.

The acetylation degree of each of the polyvinyl acetal resin (2) and the polyvinyl acetal resin (3) is preferably 0.01% by mole or more, and more preferably 0.5% by mole or more and is preferably 10% by mole or less, and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more, more preferably 63% by mole or more and is preferably 85% by mole or less, more preferably 75% by mole or less, and further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, and more preferably 60% by mole or more and is preferably 75% by mole or less, and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

(Plasticizer)

From the viewpoint of further heightening the adhesive force of an interlayer film, it is preferred that the interlayer film contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). When the thermoplastic resin contained in the interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

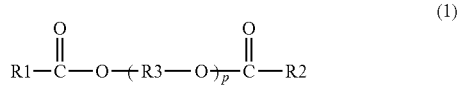

$$R1-\overset{O}{\underset{\|}{C}}-O-(R3-O)_{p}-\overset{O}{\underset{\|}{C}}-R2 \quad (1)$$

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

In the interlayer film, the content of the plasticizer (0) relative to 100 parts by weight of the thermoplastic resin (0) is referred to as content (0). The content (0) is preferably 5 parts by weight or more, more preferably 25 parts by weight or more, further preferably 30 parts by weight or more, and is preferably 100 parts by weight or less, more preferably 60 parts by weight or less, further preferably 50 parts by weight or less. When the content (0) is the above lower limit or more, the penetration resistance of laminated glass is further enhanced. When the content (0) is the above upper limit or less, the transparency of the interlayer film is further enhanced.

In the first layer, the content of the plasticizer (1) relative to 100 parts by weight of the thermoplastic resin (1) is referred to as content (1). The content (1) is preferably 50 parts by weight or more, more preferably 55 parts by weight or more, further preferably 60 parts by weight or more, and is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

In the second layer, the content of the plasticizer (2) relative to 100 parts by weight of the thermoplastic resin (2) is referred to as content (2). In the third layer, the content of the plasticizer (3) relative to 100 parts by weight of the thermoplastic resin (3) is referred to as content (3). Each of the content (2) and the content (3) is preferably 5 parts by weight or more, more preferably 10 parts by weight or more, still more preferably 15 parts by weight or more, further preferably 20 parts by weight or more, especially preferably 24 parts by weight or more, and most preferably 25 parts by weight or more. Each of the content (2) and the content (3) is preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

For the purpose of heightening the sound insulating properties of laminated glass, it is preferred that the content (1) be larger than the content (2) and it is preferred that the content (1) be larger than the content (3).

From the viewpoint of further heightening the sound insulating property of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

(Heat Shielding Substance)

It is preferred that the interlayer film contain a heat shielding substance (heat shielding compound). It is preferred that the first layer contain a heat shielding substance. It is preferred that the second layer contain a heat shielding substance. It is preferred that the third layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles.

Ingredient X:

It is preferred that the interlayer film include at least one kind of Ingredient X among a phthalocyanine compound, a naphthalocyanine compound, and an anthracyanine compound. It is preferred that the first layer contain the Ingredient X. It is preferred that the second layer contain the Ingredient X. It is preferred that the third layer contain the Ingredient X. The Ingredient X is a heat shielding substance. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film or in 100% by weight of a layer containing the Ingredient X (a first layer, a second layer, or a third layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a first layer, a second layer, or a third layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 µm or more, more preferably 0.02 µm or more, and is preferably 0.1 µm or less, more preferably 0.05 µm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, or a third layer), the content of the heat shielding particles is preferably 0.01% by weight or more, more preferably 0.1% by weight or more, further preferably 1% by weight or more, especially preferably 1.5% by weight or more. In 100% by weight of the interlayer film, or in 100% by weight of a layer containing the heat shielding particles (a first layer, a second layer, or a third layer), the content of the heat shielding particles is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding properties are sufficiently enhanced and the visible light transmittance is sufficiently enhanced.

(Metal Salt)

It is preferred that the interlayer film contain at least one kind of metal salt (hereinafter, sometimes described as Metal salt M) among an alkali metal salt, an alkaline earth metal salt, and a magnesium salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a glass plate or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a first layer, a second layer, or a third layer) is preferably 5 ppm or more, more preferably 10 ppm or more, and further preferably 20 ppm or more and is preferably 300 ppm or less, more preferably 250 ppm or less, and further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet Ray Screening Agent)

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and 2-[4,6-bis(2,4-dimethylphenyl)-1,3,5-triazin-2-yl]-5-(octyloxy)phenol ("UV-1164" available from SUN CHEMICAL COMPANY LTD.).

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of a layer containing the ultraviolet ray screening agent (a first layer, a second layer, or a third layer), the content of the ultraviolet ray screening agent is preferably 0.1% by weight or more, more preferably 0.2% by weight or more, further preferably 0.3% by weight or more, especially preferably 0.5% by weight or more. In 100% by weight of a layer containing the ultraviolet ray screening agent (a first layer, a second layer, or a third layer), the content of the ultraviolet ray screening agent is preferably 2.5% by weight or less, more preferably 2% by weight or less, further preferably 1% by weight or less, especially preferably 0.8% by weight or less. When the content of the ultraviolet ray screening agent is the above-described lower limit or more and the above-described upper limit or less, deterioration in visible light transmittance after a lapse of a period is further suppressed. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and "ADK STAB AO-40" available from ADEKA CORPORATION.

With regard to the interlayer film and laminated glass, in order to maintain high visible light transmittance thereof over a long period of time, the content of the oxidation inhibitor is preferably 0.03% by weight or more, more preferably 0.1% by weight or more in 100% by weight of the interlayer film or in 100% by weight of the layer containing the oxidation inhibitor (a first layer, a second layer, or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Light Stabilizer)

It is preferred that the interlayer film contain a light stabilizer. It is preferred that the first layer contain a light stabilizer. It is preferred that the second layer contain a light stabilizer. It is preferred that the third layer contain a light stabilizer. By using the light stabilizer, discoloration is further suppressed and the visible light transmittance is less likely to lower even when the interlayer film is used over a long term or exposed to sunlight. One kind of the light stabilizer may be used alone and two or more kinds thereof may be used in combination.

From the viewpoint of further suppressing the discoloration, it is preferred that the light stabilizer be a hindered amine light stabilizer.

Examples of the hindered amine light stabilizer include hindered amine light stabilizers in which an alkyl group, an alkoxy group or a hydrogen atom is bonded to a nitrogen atom of the piperidine structure. From the viewpoint of further suppressing the discoloration, a hindered amine light stabilizer in which an alkyl group or an alkoxy group is bonded to a nitrogen atom of the piperidine structure is preferred. The hindered amine light stabilizer is preferably a hindered amine light stabilizer in which an alkyl group is bonded to a nitrogen atom of the piperidine structure, and also preferably a hindered amine light stabilizer in which an alkoxy group is bonded to a nitrogen atom of the piperidine structure.

As the hindered amine light stabilizer in which an alkyl group is bonded to a nitrogen atom of the piperidine structure, "Tinuvin 765" and "Tinuvin 622SF" available from BASF, and "ADK STAB LA-52" available from ADEKA, or the like can be recited.

As the hindered amine light stabilizer in which an alkoxy group is bonded to a nitrogen atom of the piperidine structure, "Tinuvin XT-850FF" and "Tinuvin XT-855FF" available from BASF, and "ADK STAB LA-81" available from ADEKA, or the like can be recited.

As the hindered amine light stabilizer in which a hydrogen atom is bonded to a nitrogen atom of the piperidine structure, "Tinuvin 770DF" available from BASF, and "Hostavin N24" available from Clariant, or the like can be recited.

From the viewpoint of further suppressing the discoloration, the light stabilizer has a molecular weight of preferably 2000 or less, more preferably 1000 or less, further preferably 700 or less.

In 100% by weight of the interlayer film or in 100% by weight of a layer containing the light stabilizer (a first layer, a second layer, or a third layer), the content of the light stabilizer is preferably 0.0025% by weight or more, more preferably 0.025% by weight or more, and is preferably 0.5% by weight or less, more preferably 0.3% by weight or less. When the content of the light stabilizer is the above lower limit or more and the above upper limit or less, discoloration is efficiently suppressed.

(Other Ingredients)

Each of the interlayer film, the first layer, the second layer, and the third layer may contain additives such as a coupling agent, a dispersing agent, a surfactant, a flame retardant, an antistatic agent, a pigment, a dye, an adhesive force regulator other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film)

The distance between one end and the other end of the interlayer film is preferably 0.5 m or more, more preferably 0.8 m or more, and especially preferably 1 m or more, and is preferably 3 m or less, more preferably 2 m or less, and especially preferably 1.5 m or less. When the interlayer film has a lengthwise direction and a widthwise direction, the distance between one end and the other end is the distance in the lengthwise direction of the interlayer film. When the interlayer film has a square planar shape, the distance between one end and the other end is a distance between one end and the other end that are opposed to each other.

From the viewpoint of further improving the sound insulating properties of laminated glass when the interlayer film has a two or more-layer structure or a three or more-layer structure, the glass transition temperature of the first layer is preferably 30° C. or less, more preferably 20° C. or less, further preferably 10° C. or less. The glass transition temperature of the first layer is preferably −15° C. or more.

The thickness of the interlayer film is not particularly limited. From the viewpoint of the practical aspect and the viewpoint of sufficiently heightening the heat shielding property, the thickness of the interlayer film is preferably 0.1 mm or more, and more preferably 0.25 mm or more and is preferably 3 mm or less, and more preferably 1.5 mm or less. When the thickness of the interlayer film is the above-described lower limit or more, the penetration resistance of laminated glass is enhanced. When the thickness of the interlayer film is the above upper limit or less, the transparency of the interlayer film is further improved.

The thickness of the interlayer film is designated as T. From the viewpoint of further preventing breakage in an end part of the laminated glass under external impact in the case of a multi-layered interlayer film, the thickness of the first layer is preferably 0.0625T or more, more preferably 0.1 T or more, and is preferably 0.375 T or less, more preferably 0.25 T or less.

From the viewpoint of further preventing breakage in an end part of the laminated glass under external impact, the thickness of each of the second layer and the third layer is preferably 0.625 T or more, more preferably 0.75 T or more, and is preferably 0.9375 T or less, more preferably 0.9 T or less. When the thickness of each of the second layer and the third layer is the above-described lower limit or more and the above-described upper limit or less, bleeding out of the plasticizer can be suppressed.

From the viewpoint of further preventing breakage in an end part of the laminated glass under external impact, a total thickness of the second layer and the third layer is preferably 0.625 T or more, more preferably 0.75 T or more, and is preferably 0.9375 T or less, more preferably 0.9 T or less when the interlayer film includes the second layer and the third layer. When the total thickness of the second layer and the third layer is the above-described lower limit or more and the above-described upper limit or less, bleeding out of the plasticizer can be suppressed.

The interlayer film may be an interlayer film having a uniform thickness, or may be an interlayer film having varying thickness. The sectional shape of the interlayer film may be a rectangular shape and may be a wedge-like shape.

The method for producing the interlayer film is not particularly limited. In the case of a single-layered interlayer film, examples of the production method of the interlayer film include a method of extruding a resin composition with an extruder. In the case of a multi-layered interlayer film, examples of the production method of the interlayer film include a method of separately forming respective resin compositions used for constituting respective layers into respective layers, and then layering the respective obtained layers, a method of coextruding respective resin compositions used for constituting respective layers with an extruder and layering the respective layers, and the like. A production method of extrusion-molding is preferred because the method is suitable for continuous production.

For the reason of excellent production efficiency of the interlayer film, it is preferred that the second layer and the third layer contain the same polyvinyl acetal resin. For the reason of excellent production efficiency of the interlayer film, it is preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calendar roll method, and a profile extrusion method. The emboss roll method is preferred because a large number of embosses of the protrusions and recesses, which is a quantitatively constant protrusions and recesses pattern, can be formed.

(Other Details of Laminated Glass)

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like. The glass plate may be a tempered glass plate. By using the tempered glass plate, it is possible to further prevent breakage in an end part of the laminated glass under external impact.

The thickness of each of the first glass plate and the second glass plate is preferably 1.0 mm or more, preferably 5.0 mm or less, more preferably 3.0 mm or less, still more preferably 2.3 mm or less, further preferably 2.1 mm or less, still further preferably 2.0 mm or less, especially preferably 1.9 mm or less. When the thickness of the first glass plate and the second glass plate is smaller than 1.9 mm, the thickness of each of the first glass plate and the second glass plate is preferably 1.8 mm or less, more preferably 1.6 mm or less, further preferably 1.4 mm or less. In the laminated glass having the configuration of the present invention, breakage in an end part of the laminated glass is prevented under external impact even when the thickness of the first glass plate is small.

The thickness of the laminated glass is preferably 2 mm or more, more preferably 10 mm or less, still more preferably 6 mm or less, further preferably 5 mm or less, still further preferably 4 mm or less, especially preferably 3 mm or less. In the laminated glass having the configuration of the present invention, breakage in an end part of the laminated glass is prevented under external impact even when the thickness of the laminated glass is 3 mm or less.

The method for producing the laminated glass is not particularly limited. First, the interlayer film is sandwiched between the first glass plate and the second glass plate to obtain a laminate. Then, for example, by passing the obtained laminate through pressure rolls or subjecting the obtained laminate to decompression suction in a rubber bag, the air remaining between the first glass plate and the second glass plate, and the interlayer film is removed. Then, the laminate is preliminarily bonded together at about 70 to 110° C. to obtain a preliminarily press-bonded laminate. Next, by putting the preliminarily press-bonded laminate into an autoclave or by pressing the laminate, the laminate is press-bonded at about 120 to 150° C. and under a pressure of 1 to 1.5 MPa. In this way, laminated glass can be obtained.

Each of the interlayer film and the laminated glass can be used for automobiles, railway vehicles, aircraft, ships, buildings, and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass, roof glass or glass for backlight of an automobile, and the like. The interlayer film and the laminated glass are suitably used for automobiles. The interlayer film is used for obtaining laminated glass of an automobile.

In the present invention, since it is possible to prevent breakage in an end part of the laminated glass under external impact, it is preferred that the laminated glass be used as side glass, roof glass or glass for backlight in automobiles. The side glass is easy to visually recognize. The quality of the roof glass is easily altered by the sunlight or the like. Regarding the glass for backlight, a defect in appearance is easily recognized by backlight. By using the laminated glass according to the present invention as side glass, roof glass or glass for backlight, it is possible to maintain excellent appearance because the laminated glass is difficult to be broken. It is preferred that the laminated glass be used as glass for windshield in automobiles.

In the portion where the lateral surface of the interlayer film is exposed in the laminated glass, it is preferred that black coating be not applied on the adhesion surface between an end part of the interlayer film and an end part of the glass plate on the exterior side. In the portion where the lateral surface of the interlayer film is exposed in the laminated glass, it is preferred that black coating be not applied on the adhesion surface between an end part of the interlayer film and an end part of the first glass plate. In the portion where the lateral surface of the interlayer film is exposed in the laminated glass, it is preferred that black coating be not applied on the adhesion surface between an end part of the interlayer film and an end part of the second glass plate. It is preferred that black coating be not applied on the adhesion surface in the region up to the position of 0.5 mm inwardly from the lateral surface of the interlayer film. It is more preferred that black coating be not applied on the adhesion surface in the region up to the position of 1 cm inwardly from the lateral surface of the interlayer film. It is further preferred that black coating be not applied on the adhesion surface in the region up to the position of 5 cm inwardly from the lateral surface of the interlayer film.

Hereinafter, the present invention will be described in more detail with reference to examples and comparative examples. The present invention is not limited only to these examples.

The following thermoplastic resins were used.

With regard to the polyvinyl butyral resin (PVB) used in the following examples and comparative examples, the butyralization degree (the acetalization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Polyvinyl Acetal Resin (1A))

Polyvinyl butyral resin having an average polymerization degree of 3000, a butyralization degree of 65% by mole, an acetylation degree of 12% by mole, and a content of the hydroxyl group of 23% by mole.

(Polyvinyl Acetal Resin (2A)) (Also Used as a Thermoplastic Resin for Forming Third Layer)

Polyvinyl butyral resin having an average polymerization degree of 1700, a butyralization degree of 69% by mole, an acetylation degree of 1% by mole, and a content of the hydroxyl group of 30% by mole.

(Ionomer Resin)

Ionomer resin (11) ("Himilan PV8727" available from DU PONT-MITSUI POLYCHEMICALS CO., LTD.)

(Ethylene-Vinyl Acetate Copolymer Resin)

Ethylene-vinyl acetate copolymer resin (21) ("CVF450" available from Dai Nippon Printing Co., Ltd.)

Example 1

Preparation of Composition for Forming First Layer:

The following ingredients were mixed, and kneaded sufficiently with a mixing roll to obtain a composition for forming a first layer.

100 parts by weight of polyvinyl acetal resin (1A)

60 parts by weight of triethylene glycol di-2-ethylhexanoate (3GO) which is a plasticizer An amount that is to be 0.2% by weight in the obtained first layer of an ultraviolet ray screening agent (2-(2'-hydroxy-3'-t-butyl-5-methylphenyl)-5-chlorobenzotriazole)

An amount that is to be 0.1% by weight in the obtained first layer of an oxidation inhibitor (6,6'-di-t-butyl-4,4'-butylidenedi-m-cresol)

Preparation of Composition for Forming Second Layer and Third Layer:

The following ingredients were mixed, and kneaded sufficiently with a mixing roll to obtain a composition for forming a second layer and a third layer.

100 parts by weight of polyvinyl acetal resin (2A)

40 parts by weight of triethylene glycol di-2-ethylhexanoate (3GO) which is a plasticizer An amount that is to be 0.2% by weight in the obtained second layer and the third layer of an ultraviolet ray screening agent (2-(2-hydroxy-3-t-butyl-5-methylphenyl)-5-chlorobenzotriazole)

An amount that is to be 0.1% by weight in the obtained second layer and third layer of an oxidation inhibitor (6,6'-di-t-butyl-4,4'-butylidenedi-m-cresol) An amount that is to be a metal element concentration (Mg concentration) of 70 ppm in the obtained second layer and third layer of a Mg mixture (50:50 (weight ratio) mixture of magnesium 2-ethylbutyrate and magnesium acetate)

Preparation of Interlayer Film (1):

By extruding the composition for forming a first layer and the composition for forming a second layer and a third layer using an extruder, an interlayer film (1) having a three-layer structure (thickness 760 μm, a structure of a second layer/a first layer/a third layer) was prepared. The first layer had a thickness of 100 μm, and each of the second layer and the third layer had a thickness of 330 μm.

Preparation of Laminate:

The obtained interlayer film was cut out into a piece of 8 cm long×8 cm wide. Then interlayer film (1) was sandwiched between the first glass plate and the second glass plate (8 cm long×7 cm wide) shown in Table 1, and vacuum-pressed by retention at 90° C. for 30 minutes with a vacuum laminator, to obtain a laminate.

Preparation of Laminated Glass Having Interlayer Film (2) (Test Laminated Glass):

In an end part of the laminate, a thermosetting agent ("HALSHYBRID UV-G301" available from NIPPON SHOKUBAI CO., LTD.) was injected. (A method of treating an end part of the laminate) The thermosetting agent was injected up to the position of 3 mm inwardly from an end part of the laminate. Sequentially, the laminate was heated to 100° C. to set the thermosetting agent. The interlayer film (2) in which the interlayer film (1) was partially hardened was formed.

Thereafter, the part protruding from the glass plate was cut off to obtain laminated glass (test laminated glass). A total of ten laminated glasses were prepared. In the obtained laminated glasses, there were a first region where the thermosetting agent is not injected between the first glass plate and the second glass plate, and a second region that was hardened by the thermosetting agent on the periphery of the first region. The second region that was hardened by the thermosetting agent did not protrude laterally from the portion where the first glass plate and the second glass plate are opposed to each other.

Example 2

A laminated glass was obtained in the same manner as that in Example 1 except that in the method of treating an end part of the laminate, a plurality of micro capsules O-442 (diameter 0.25 μm, "Selosol MC 0-442" available from CHUKYO YUSHI CO., LTD.) were inserted in an end part of the laminate, to cover the interlayer film part of the end part of the interlayer film (1) with the insert, to form the interlayer film (2). In the obtained laminated glass, there were a first region where no micro capsules exist, and a second region where micro capsules exist on the periphery of the first region, between the first glass plate and the second glass plate. The second region where micro capsules exist did not protrude laterally from the portion where the first glass plate and the second glass plate are opposed to each other.

Example 3

A laminated glass was obtained in the same manner as that in Example 1 except that in the method of treating an end part of the laminate, an UV curing agent ("SX-UV200" available from CEMEDINE Co., Ltd.) was injected in an end part of the laminate, and then the UV curing agent is cured by irradiation with ultraviolet ray, to form the interlayer film (2). In the obtained laminated glasses, there were a first region where the UV curing agent was not injected, and a second region that was hardened by the UV curing agent on the periphery of the first region, between the first glass plate and the second glass plate. The second region that was hardened by the UV curing agent did not protrude laterally from the portion where the first glass plate and the second glass plate are opposed to each other.

Examples 4 to 9

A laminated glass was obtained in the same manner as that in Example 1 except that the first glass plate and the second glass plate shown in the following Tables 1, 2 were used.

Comparative Example 1

A laminated glass was obtained in the same manner as that in Example 1 except that the method of treating an end part of the laminate was not performed.

Example 10

Preparation of Composition for Forming Interlayer Film (1):

The following ingredients were mixed, and kneaded sufficiently with a mixing roll to obtain a composition for forming an interlayer film (1).

100 parts by weight of ionomer resin (11)

An amount that is to be 0.2% by weight in the obtained interlayer film of an ultraviolet ray screening agent (2-(2'-hydroxy-3'-t-butyl-5-methylphenyl)-5-chlorobenzotriazole)

An amount that is to be 0.1% by weight in the obtained interlayer film of an oxidation inhibitor (6,6'-di-t-butyl-4,4'-butylidenedi-m-cresol)

An amount that is to be a metal element concentration (Mg concentration) of 70 ppm in the obtained interlayer film of a Mg mixture (50:50 (weight ratio) mixture of magnesium 2-ethylbutyrate and magnesium acetate)

Preparation of Interlayer Film:

By extruding a composition for forming an interlayer film with an extruder, a single-layered interlayer film (thickness: 760 μm) was prepared.

Preparation of Laminated Glass:

A laminate was obtained in the same manner as that in Example 1 except that the obtained interlayer film (1) was used. A laminated glass was obtained in the same manner as that in Example 1 except that the obtained laminate was used.

Example 11

A laminated glass was obtained in the same manner as that in Example 10 except that the ionomer resin (11) was changed to ethylene-vinyl acetate copolymer resin (21).

(Evaluation)

(1) Evaluation of Weight of Broken Glass Pieces Under External Impact

Dipping-Light Irradiation Test:

Among the prepared ten laminated glasses, five laminated glasses were subjected to a dipping-light irradiation test. In the dipping-light irradiation test, the following process was conducted: dipping five laminated glasses before the dipping-light irradiation test in pure water at 80° C. for 24 hours; removing the laminated glasses from the pure water; wiping off water of the laminated glass; leaving the laminated glasses to stand at 23° C. for 4 hours; and subjecting the laminated glasses to irradiation with xenon light for 144 hours at a black panel temperature of 83° C., a temperature inside the vessel of 53° C. and a humidity of 50% RH. The laminated glass after the dipping-light irradiation test was obtained by conducting 15 cycles of the process. The irradiation with xenon light was conducted with an irradiance of 180 W/m², a wavelength for measuring the irradiance of 300 to 400 nm, an inner filter of quartz, and an outer filter of quartz: #275 (cutoff 275 nm).

Ball Drop Test:

Five of the prepared ten laminated glasses were used as laminated glasses not having undergone a dipping-light irradiation test. Five laminated glasses after the dipping-light irradiation test obtained in the manner as described above were prepared.

For each of the five laminated glasses before the dipping-light irradiation test and the five laminated glasses after the dipping-light irradiation test, an iron ball having a diameter of 1.5 inches and a weight of 229 g was dropped from a height of 30 cm at a position of 0.5 mm inwardly from a lateral surface of the laminated glass in the portion where the lateral surface of the interlayer film was exposed. When the two glass plates have different thicknesses, the iron ball was dropped on the thinner glass plate side. When the two glass plates have equal thickness, and the two glass plates are the same in kind, the iron glass was dropped on one glass plate side. The weight of broken glass pieces determined by the ball drop test was obtained by measuring a weight of broken glass pieces released from the interlayer film. The ball drop test was conducted once for each of the five laminated glasses not having undergone the dipping-light irradiation test, namely five times in total, and an average of the five times was employed as a weight of broken glass pieces in the ball drop test. The ball drop test was conducted once for each of the five laminated glasses after the dipping-light irradiation test, namely five times in total, and an average of the five times was employed as a weight of broken glass pieces in the ball drop test.

The weight A of broken glass pieces in the ball drop test in the laminated glass not having undergone a dipping-light irradiation test was determined. The weight B of broken glass pieces in the ball drop test in the laminated glass after the dipping-light irradiation test was determined.

(2) Breakage in End Part of Laminated Glass Under External Impact

Breakage in an end part of a laminated glass under external impact was evaluated based on the weight of broken glass pieces in the ball drop test according to the following criteria.

Criterial for Determining [Breakage in End Part of Laminated Glass Under External Impact]

○: The ratio (weight B after dipping-light irradiation test)/(weight A before dipping-light irradiation test) is 1.7 or less, revealing that breakage is significantly prevented.

Δ: The ratio (weight B after dipping-light irradiation test)/(weight A before dipping-light irradiation test) is more than 1.7 and 2.5 or less, revealing that breakage is prevented.

x: The ratio (weight B after dipping-light irradiation test)/(weight A before dipping-light irradiation test) is more than 2.5, revealing that breakage is not sufficiently prevented.

The details and the results are shown in the following Tables 1 to 3.

TABLE 1

|  |  | Example 1 | Example 2 | Example 3 | Example 4 | Example 5 |
|---|---|---|---|---|---|---|
| Configuration of laminated glass | Kind of first glass plate | Clear glass | Clear glass | Clear glass | Green glass | Soda glass |
|  | Thickness of first glass plate (mm) | 1.6 | 1.6 | 1.6 | 1.9 | 1.6 |
|  | Kind of second glass plate | Clear glass | Clear glass | Clear glass | Green glass | Soda glass |
|  | Thickness of second glass plate (mm) | 2.5 | 2.5 | 2.5 | 1.9 | 1.6 |
|  | Number of layers of interlayer film | 3 | 3 | 3 | 3 | 3 |
|  | Kind of thermoplastic resin of first layer | (1A) | (1A) | (1A) | (1A) | (1A) |
|  | Kind of thermoplastic resin of second layer and third layer | (2A) | (2A) | (2A) | (2A) | (2A) |
|  | Treatment method of end part of laminate | Thermosetting agent | Microcapsule | UV curing agent | Thermosetting agent | Thermosetting agent |

TABLE 1-continued

|  |  | Example 1 | Example 2 | Example 3 | Example 4 | Example 5 |
|---|---|---|---|---|---|---|
| Evaluation | (1) Weight A before dipping-light irradiation test (g) | 9 | 7 | 8 | 7 | 8 |
|  | (1) Weight B after dipping-light irradiation test (g) | 15 | 13 | 10 | 9.8 | 10.4 |
|  | (1) Ratio (weight B after dipping-light irradiation test)/(weight A before dipping-light irradiation test) | 1.7 | 1.9 | 1.3 | 1.4 | 1.3 |
|  | (2) Breakage in end part of laminated glass under external impact | Δ | Δ | ○ | ○ | ○ |

TABLE 2

|  |  | Example 6 | Example 7 | Example 8 | Example 9 | Comparative Example 1 |
|---|---|---|---|---|---|---|
| Configuration of laminated glass | Kind of first glass plate | Gorilla glass | Soda glass | Gorilla glass | Gorilla glass | Clear glass |
|  | Thickness of first glass plate (mm) | 1 | 1.8 | 0.7 | 0.7 | 1.6 |
|  | Kind of second glass plate | Clear glass | Soda glass | Gorilla glass | Soda glass | Clear glass |
|  | Thickness of second glass plate (mm) | 2.5 | 1.8 | 0.7 | 1.8 | 2.5 |
|  | Number of layers of interlayer film | 3 | 3 | 3 | 3 | 3 |
|  | Kind of thermoplastic resin of first layer | (1A) | (1A) | (1A) | (1A) | (1A) |
|  | Kind of thermoplastic resin of second layer and third layer | (2A) | (2A) | (2A) | (2A) | (2A) |
|  | Treatment method of end part of laminate | Thermosetting agent | Thermosetting agent | Thermosetting agent | Thermosetting agent | — |
| Evaluation | (1) Weight A before dipping-light irradiation test (g) | 6 | 7 | 7 | 7 | 10 |
|  | (1) Weight B after dipping-light irradiation test (g) | 9 | 11.2 | 11.9 | 12.6 | 51 |
|  | (1) Ratio (weight B after dipping-light irradiation test)/(weight A before dipping-light irradiation test) | 1.5 | 1.6 | 1.7 | 1.8 | 5.1 |
|  | (2) Breakage in end part of laminated glass under external impact | ○ | ○ | Δ | Δ | x |

TABLE 3

|  |  | Example 10 | Example 11 |
|---|---|---|---|
| Configuration of laminated glass | Kind of first glass plate | Clear glass | Clear glass |
|  | Thickness of first glass plate | 1.6 | 1.6 |
|  | Kind of second glass plate | Clear glass | Clear glass |
|  | Thickness of second glass plate | 2.5 | 2.5 |
|  | Number of layers of interlayer film | 1 | 1 |
|  | Kind of thermoplastic resin of first layer | (11) | (21) |
|  | Kind of thermoplastic resin of second layer and third layer | — | — |
|  | Treatment method of end part of laminate | Thermosetting agent | Thermosetting agent |
| Evaluation | (1) Weight A before dipping-light irradiation test (g) | 11 | 10 |
|  | (1) Weight B after dipping-light irradiation test (g) | 18 | 18 |
|  | (1) Ratio (weight B before dipping-light irradiation test)/(weight A before dipping-light irradiation test) | 1.6 | 1.8 |
|  | (2) Breakage in end part of laminated glass under external impact | ○ | Δ |

In Tables 1 to 3, description of the ingredients other than the thermoplastic resin is omitted.

Using each interlayer film (2) used in Examples 1 to 11, and a pair of glass plates having a size and shape for windshield, side glass, roof glass, and backlight, windshield, side glass, roof glass, and backlight were prepared as laminated glasses. These laminated glasses (windshield, side glass, roof glass, and backlight) were mounted on cars. As a result of driving of the cars on which the laminated glasses were mounted, any car showed excellent resistance against external impact.

EXPLANATION OF SYMBOLS

1: Interlayer film
1a: First surface
1b: Second surface
2: First layer
2a: First surface
2b: Second surface
3: Second layer
3a: Outer surface
4: Third layer 4a: Outer surface
11: Laminated glass
21: First glass plate
22: Second glass plate
31: Interlayer film
31a: First surface
31b: Second surface
41: Laminated glass

The invention claimed is:

1. A laminated glass comprising a first glass plate, a second glass plate, and an interlayer film,
the interlayer film being arranged between the first glass plate and the second glass plate,
the first glass plate having a thickness that is equal to a thickness of the second glass plate, or smaller than the thickness of the second glass plate,
the laminated glass having a portion where a lateral surface of the interlayer film is exposed,
an end part of the interlayer film containing (1a cured thermosetting agent, (2) a cured UV curing agent, or (3) a micro capsule,
the end part of the interlayer film containing a thermoplastic resin which is a polyvinyl acetal resin, an ethylene-vinyl acetate copolymer resin, an ethylene-acrylic acid copolymer resin, a polyurethane resin, an ionomer resin or a polyvinyl alcohol resin, or the end part of the interlayer film containing a thermoplastic resin which is a thermoplastic elastomer,
a ratio of a weight of broken glass pieces determined by a ball drop test in a laminated glass after a dipping-light irradiation test, to a weight of broken glass pieces determined by the ball drop test in a laminated glass not having undergone the dipping-light irradiation test being 2.5 or less,
the dipping-light irradiation test including conducting a process of: dipping a laminated glass before the dipping-light irradiation test in pure water at 80° C. for 24 hours; removing the laminated glass from the pure water; wiping off water of the laminated glass; leaving the laminated glass to stand at 23° C. for 4 hours; and subjecting the laminated glass to irradiation with xenon light for 144 hours at a black panel temperature of 83° C., a temperature inside a vessel of 53° C. and a humidity of 50% RH, the laminated glass after the dipping-light irradiation test being obtained by conducting 15 cycles of the process, the irradiation with xenon light being conducted with an irradiance of 180 W/m$^2$, a wavelength for measuring the irradiance of 300 to 400 nm, an inner filter of quartz, and an outer filter of quartz: #275 (cutoff 275),
the ball drop test including: storing each of a laminated glass not having undergone the dipping-light irradiation test and a laminated glass after the dipping-light irradiation test at 23±2° C. and at a humidity of 50% RH for 4 hours; and dropping a ball for each of the laminated glasses after the storing, the ball being an iron ball having a diameter of 1.5 inches and a weight of 229 g from a height of 30 cm on a side of the first glass plate at a position of 0.5 mm inwardly from a lateral surface of the laminated glass in the portion where the lateral surface of the interlayer film is exposed, the dropping of the ball being conducted under an atmosphere at 23±2° C. and a humidity of 50% RH, the weight of broken glass pieces determined by the ball drop test being obtained by measuring a weight of broken glass pieces released from the interlayer film.

2. The laminated glass according to claim 1, wherein
the interlayer film has a one-layer structure or a two or more-layer structure, and
the interlayer film includes a first layer containing a thermoplastic resin.

3. The laminated glass according to claim 2, wherein
the interlayer film has a two or more-layer structure,
the interlayer film includes a second layer containing a thermoplastic resin, and
the second layer is arranged on a first surface side of the first layer.

4. The laminated glass according to claim 3, wherein
the interlayer film has a three or more-layer structure,
the interlayer film includes a third layer containing a thermoplastic resin, and
the third layer is arranged on a second surface side opposite to the first surface of the first layer.

5. The laminated glass according to claim 2, wherein
the thermoplastic resin in the first layer is a polyvinyl acetal resin, an ionomer resin or an ethylene-vinyl acetate copolymer resin, or
the thermoplastic resin in the first layer is a thermoplastic elastomer.

6. The laminated glass according to claim 1, wherein the first glass plate has a thickness of 1.9 mm or less.

7. The laminated glass according to claim 1, wherein the first glass plate is a tempered glass plate.

8. The laminated glass according to claim 1, wherein
black coating is not applied on an adhesion surface between an end part of the interlayer film and an end part of the first glass plate in the portion where the lateral surface of the interlayer film is exposed in the laminated glass, and
black coating is not applied on an adhesion surface between an end part of the interlayer film and an end part of the second glass plate in the portion where the lateral surface of the interlayer film is exposed in the laminated glass.

9. The laminated glass according to claim 1, to be used as glass for windshield in an automobile.

10. The laminated glass according to claim 1, to be used as side glass, roof glass or glass for backlight in an automobile.

11. The laminated glass according to claim 1, wherein
the end part of the interlayer film contains (1) the cured thermosetting agent, or (3) the micro capsule.

12. The laminated glass according to claim 1, wherein
the end part of the interlayer film contains the thermoplastic resin Which is the polyvinyl acetal resin, the ethylene-vinyl acetate copolymer resin or the ionomer resin, or the end part of the interlayer film contains the thermoplastic resin which is the thermoplastic elastomer.

13. The laminated glass according to claim 1, wherein
the end part of the interlayer film contains the thermoplastic resin which is the polyvinyl acetal resin, the ethylene-vinyl acetate copolymer resin or the ionomer resin.

14. The laminated glass according to claim 1, wherein
the interlayer film contains a first region where the cured thermosetting agent is not contained and a second region where the cured thermosetting agent is contained on the periphery of the first region, the interlayer film contains a first region where the cured UV curing agent is not contained and a second region where the cured UV curing agent is contained on the periphery of the first region, or the interlayer film contains a first region where the micro capsule is not contained and a second region where the micro capsule is contained on the periphery of the first region.

* * * * *